(12) United States Patent
Hall et al.

(10) Patent No.: US 11,584,660 B2
(45) Date of Patent: Feb. 21, 2023

(54) SYSTEMS AND METHODS FOR DEWATERING, EXTRUDING, AND COMBUSTING BLACKWATER

(71) Applicant: Hall Labs LLC, Provo, UT (US)

(72) Inventors: David R. Hall, Provo, UT (US); Michael Hall, Provo, UT (US); Cody Rees, Provo, UT (US); Nathan Davis, Bountiful, UT (US)

(73) Assignee: Hall Labs LLC, Provo, UT (US)

( * ) Notice: Subject to any disclaimer, the term of this patent is extended or adjusted under 35 U.S.C. 154(b) by 182 days.

(21) Appl. No.: 16/836,844

(22) Filed: Mar. 31, 2020

(65) Prior Publication Data

US 2021/0300783 A1 Sep. 30, 2021

(51) Int. Cl.
| | | |
|---|---|---|
| *C02F 1/00* | (2006.01) | |
| *C02F 11/06* | (2006.01) | |
| *B01D 29/82* | (2006.01) | |
| *B01D 29/11* | (2006.01) | |
| *C02F 103/00* | (2006.01) | |
| *B01D 29/075* | (2006.01) | |

(52) U.S. Cl.
CPC ............ *C02F 1/001* (2013.01); *B01D 29/117* (2013.01); *B01D 29/828* (2013.01); *C02F 11/06* (2013.01); *B01D 29/075* (2021.08); *B01D 2221/02* (2013.01); *C02F 2103/005* (2013.01); *C02F 2209/40* (2013.01)

(58) Field of Classification Search
CPC .......................... C02F 1/001; C02F 2103/005; C02F 2209/40; C02F 2209/005; C02F 11/06; C02F 11/125; B01D 29/117; B01D 29/828; B01D 29/075; B01D 29/35; B01D 29/82; B01D 29/11; B01D 2221/02; Y02W 10/40
USPC ........................................................ 210/175
See application file for complete search history.

(56) References Cited

U.S. PATENT DOCUMENTS

| 2015/0182879 A1* | 7/2015 | Boerger ................ C02F 11/125 210/405 |
| 2019/0023598 A1* | 1/2019 | Hunt ..................... C02F 11/121 |

\* cited by examiner

*Primary Examiner* — Akash K Varma

(57) ABSTRACT

Systems and methods for disposing of blackwater are disclosed. A first vessel contains a screw running through the vessel from a first end to a second end. The screw is surrounded radially by a filter. The first vessel has a blackwater inlet adjacent the first end. An extrusion plate is adjacent the second end of the first vessel. A combustor vessel is configured to receive a solids component from the extrusion plate. A blackwater stream, consisting of a liquid component and the solids component, is passed through the blackwater inlet into the first vessel, is conveyed by the screw from the first end to the second end, and is pressurized against the extrusion plate. The liquid component is thereby forced from the blackwater stream through the filter and the solids component is forced through the extrusion plate into the combustor. The combustor is configured to combust the solids component.

10 Claims, 5 Drawing Sheets

SYSTEMS AND METHODS FOR DEWATERING, EXTRUDING, AND COMBUSTING BLACKWATER

TECHNICAL FIELD

The systems and devices described herein relate generally to blackwater handling.

BACKGROUND

Waste streams, especially blackwater streams, require careful treatment. On a large scale, traditional bioreactors and sludge treatment is capable of handling this material. On a small scale, such as in recreational vehicles, blackwater is typically an annoyance at best and a significant hurdle at worst. Other small scale blackwater producers include remote work sites, remote cabins, and small villages in developing nations. Traditional treatment methods are typically too large in scale or too impractical to implement for a single recreational vehicle, remote work site, or cabin. Simplifying the handling of waste solids, especially blackwater solids, is required.

SUMMARY

In a first aspect, the disclosure provides a system for disposing of blackwater. A first vessel contains a screw running through the vessel from a first end to a second end. The screw is surrounded radially by a filter. The first vessel has a blackwater inlet adjacent the first end. An extrusion plate is adjacent the second end of the first vessel. A combustor vessel is configured to receive a solids component from the extrusion plate. A blackwater stream, consisting of a liquid component and the solids component, is passed through the blackwater inlet into the first vessel, is conveyed by the screw from the first end to the second end, and is pressurized against the extrusion plate. The liquid component is thereby forced from the blackwater stream through the filter and the solids component is forced through the extrusion plate into the combustor vessel. The combustor vessel is configured to combust the solids component.

In a second aspect, the disclosure provides a method for disposing of blackwater. A first vessel contains a screw running through the vessel from a first end to a second end. The screw is surrounded radially by a filter. The first vessel has a blackwater inlet adjacent the first end. An extrusion plate is adjacent the second end of the first vessel. A combustor vessel is adjacent the extrusion plate. A blackwater stream, consisting of a liquid component and a solids component, is passed through the blackwater inlet and into the first vessel. The blackwater stream is conveyed by the screw from the first end to the second end. The blackwater stream is pressurized against the extrusion plate such that the liquid component is forced from the blackwater stream through the filter and the solids component is forced through the extrusion plate into the combustor. The solids component is combusted in the combustor vessel.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1:
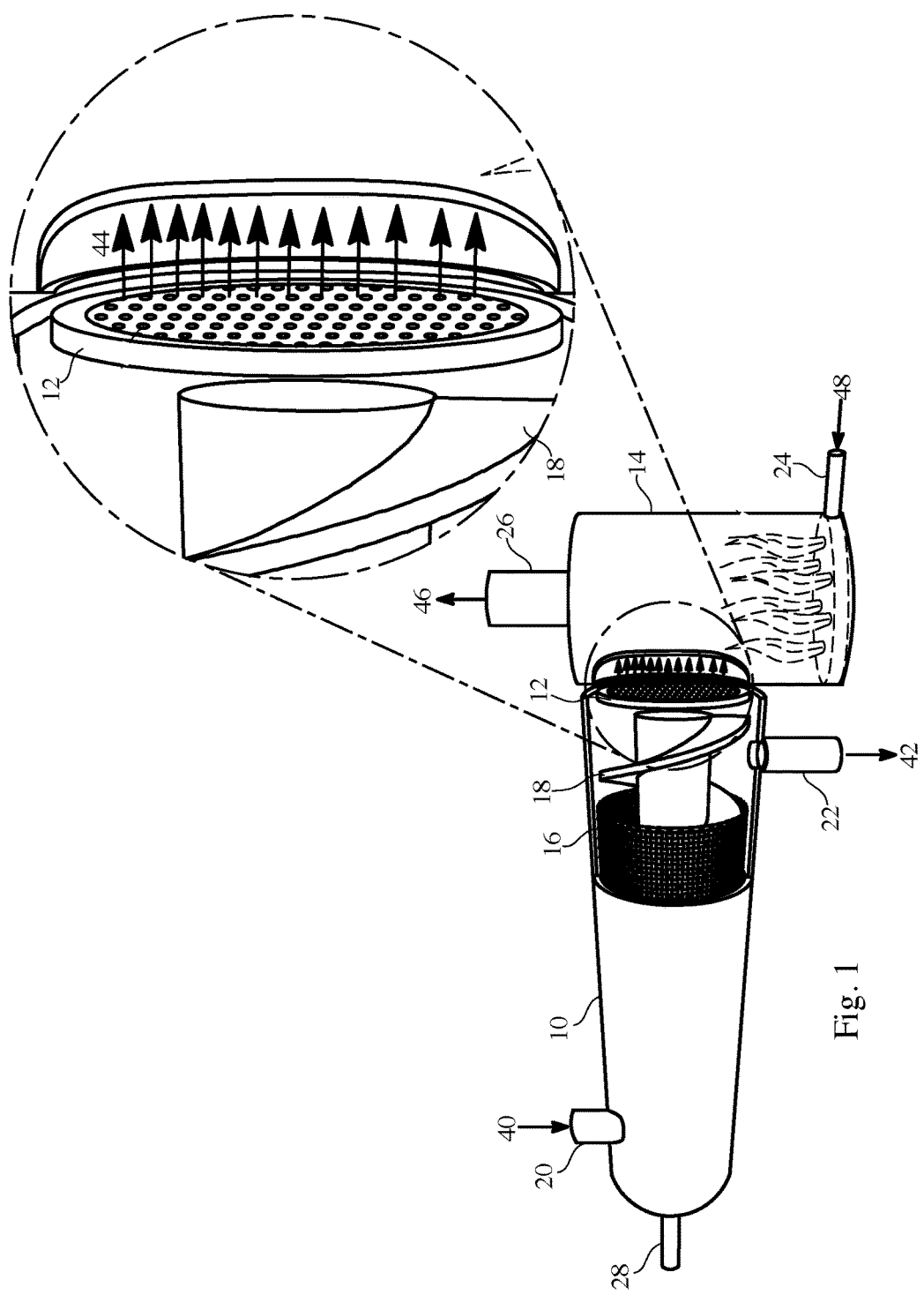
FIG. 1 is an isometric cutaway view of a system for disposing of blackwater.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "blackwater" is meant to refer to a waste stream comprising waste solids, such as feces, paper products, hygiene products, and sanitary products, as well as water and urine, typically from a toilet.

As used herein, a "screw" is meant to refer to screws, augers, and other rotary solids movement devices.

As used herein, an "extrusion plate" is meant to refer to any grated, serrated, holed, or otherwise divided device that can be used for extruding flowable solids, thick pastes, slurries, and other non-Newtonian liquids.

The small-scale waste stream producer is typically underserved in industry. Small-scale waste stream producers, including recreational vehicles, remote work sites, thirdworld villages, and remote cabins, typically cannot afford expensive waste treatment systems. Blackwater is the most typical waste stream envisioned, but other waste streams, such as food waste, may be treated by the methods and systems described herein. The disclosed invention, as related to recreational vehicles, can be used as part of a "Never Dump/Never Fill" philosophy for recreational vehicles. Recreational vehicle users typically dread the dumping part of recreational vehicle usage. As a part of the "Never Dump" philosophy, the inventions disclosed describe systems and methods for waste solids disposal accomplished without user involvement, eliminating dumping. In a preferred embodiment, the waste streams are those of a small-scale waste stream producer.

Blackwater solids are difficult to dispose of for many reasons, one of which is the liquid content. Dewatering blackwater solids can be done, but the solids produced then have to be dealt with by solids handling. The present invention both eliminates substantially all of the liquid content of the blackwater solids and the need for any solids handling. The blackwater is added to a vessel with a screw that runs through the vessel, carrying the blackwater towards the second end of the vessel. The screw is surrounded radially by a filter. The solids content of the blackwater are pressed against the second end of the vessel where an extrusion plate is located. Because of the backpressure due to the restricted flow nature of the extrusion plate, the liquid content of the blackwater solids is forced radially outward through the filter. The solids content is extruded through the extrusion plate and directly into a combustor. The combustor is configured to then combust the solids, either continuously or in batches. The liquid content can be added to graywater systems and water recovered.

In a preferred embodiment, "substantially all of the liquid content" is more than 50 wt % of the liquid content. In a more preferred embodiment, "substantially all of the liquid content" is more than 70 wt % of the liquid content. In a most preferred embodiment, "substantially all of the liquid content" is more than 90 wt % of the liquid content.

Figure 2:
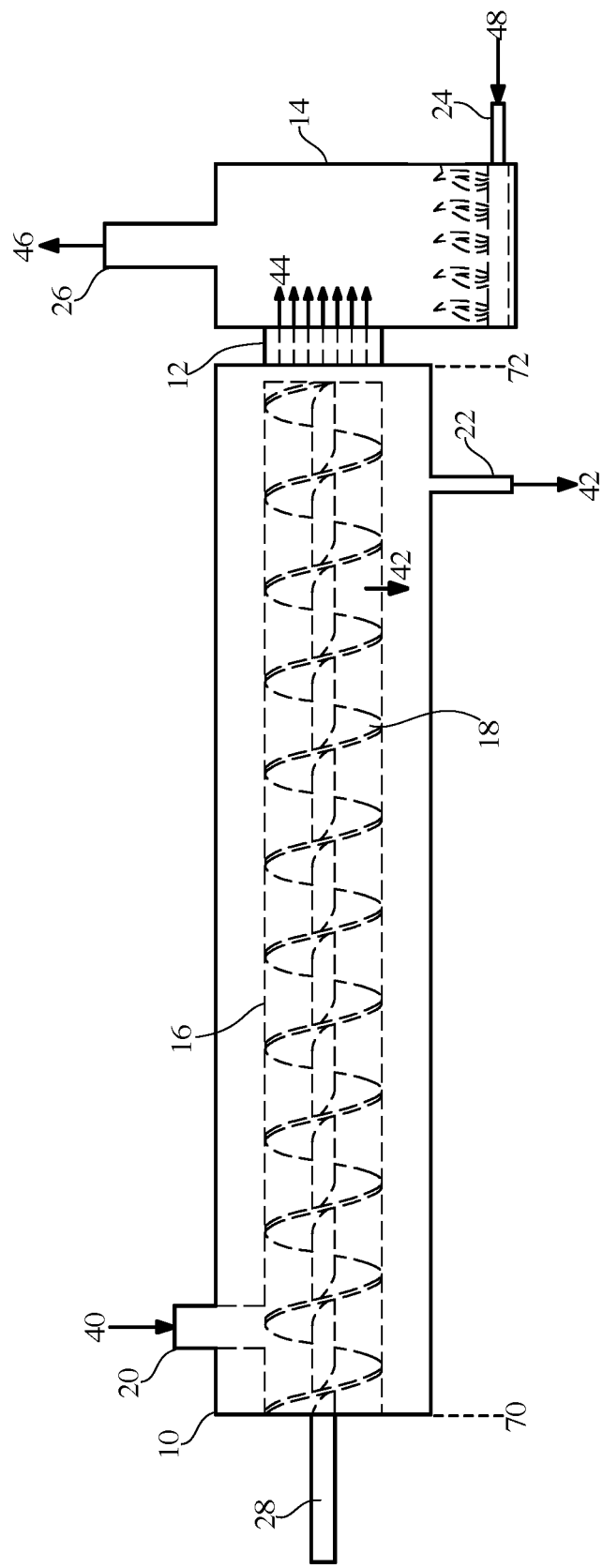
FIG. 2 is an elevation view of the system for disposing of blackwater of FIG. 2.

FIG. 1 is an isometric cutaway view of a system for disposing of blackwater that may be used in one embodiment of the present invention. FIG. 2 is an elevation view of the system for disposing of blackwater of FIG. 2. A first vessel 10 has a screw 18 running through the vessel from a first end 70 to a second end 72. The screw 18 is driven by a shaft 28 and is surrounded radially by a filter 16. The first vessel 10 has a blackwater inlet 20 adjacent the first end 70 and a liquid component outlet 22 adjacent the second end 72. An extrusion plate 12 is adjacent the second end 72 of the first vessel 10. A combustor vessel 14 is configured to receive a solids component 44 from the extrusion plate 12. The combustor vessel has a fuel and air mix inlet 24 that receives a fuel and air mix 48 for combusting the blackwater solids 44. The combustor vessel 14 has a combustion gas outlet 26 through which combustion gas 46 escapes. A blackwater stream 40 has a liquid component and a solids component. The blackwater stream 40 is passed through the blackwater inlet 20 into the first vessel 10 and is conveyed by the screw 18 from the first end 70 to the second end 72, and is pressurized against the extrusion plate 12 such that the liquid component 42 is forced from the blackwater stream 40 through the filter 16 and the solids component 44 is forced through the extrusion plate 12 into the combustor vessel 14. The combustor vessel receives a fuel and air mix 48 through the inlet 24 and combusts the solids component 44, resulting in combustion gas 46.

Figure 3:
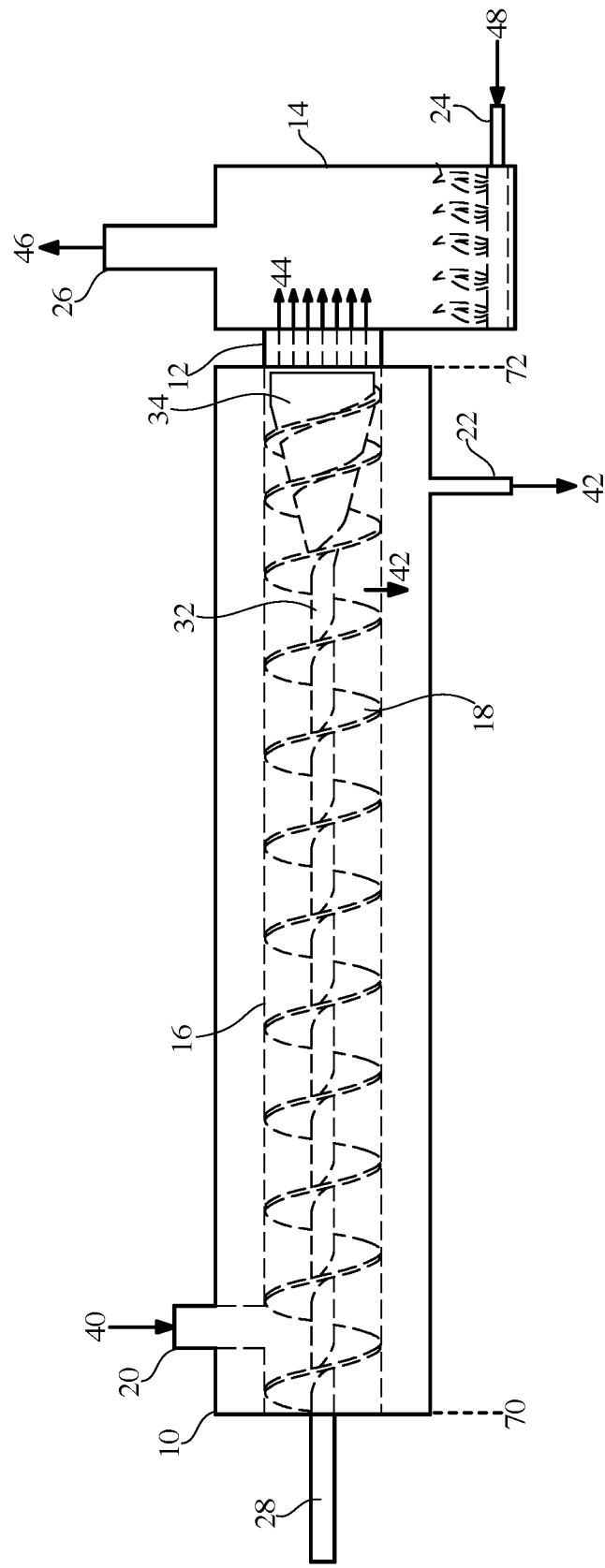
FIG. 3 is an elevation view of a system for disposing of blackwater using an auger with a decreasing pitch.

FIG. 3 is an elevation view of a system for disposing of blackwater using an auger with a decreasing pitch that may be used in one embodiment of the present invention. The description of FIG. 3 is identical to FIGS. 1 and 2, except the decreasing pitch. The screw 18 has a shaft 28 that starts with a narrow diameter 32 and then increases to a diameter 34 just smaller than the diameter of the filter 16. The decreased diameter contributes to the back pressure on the blackwater stream 40, further forcing the liquid component 42 out of the blackwater stream 40.

Figure 4:
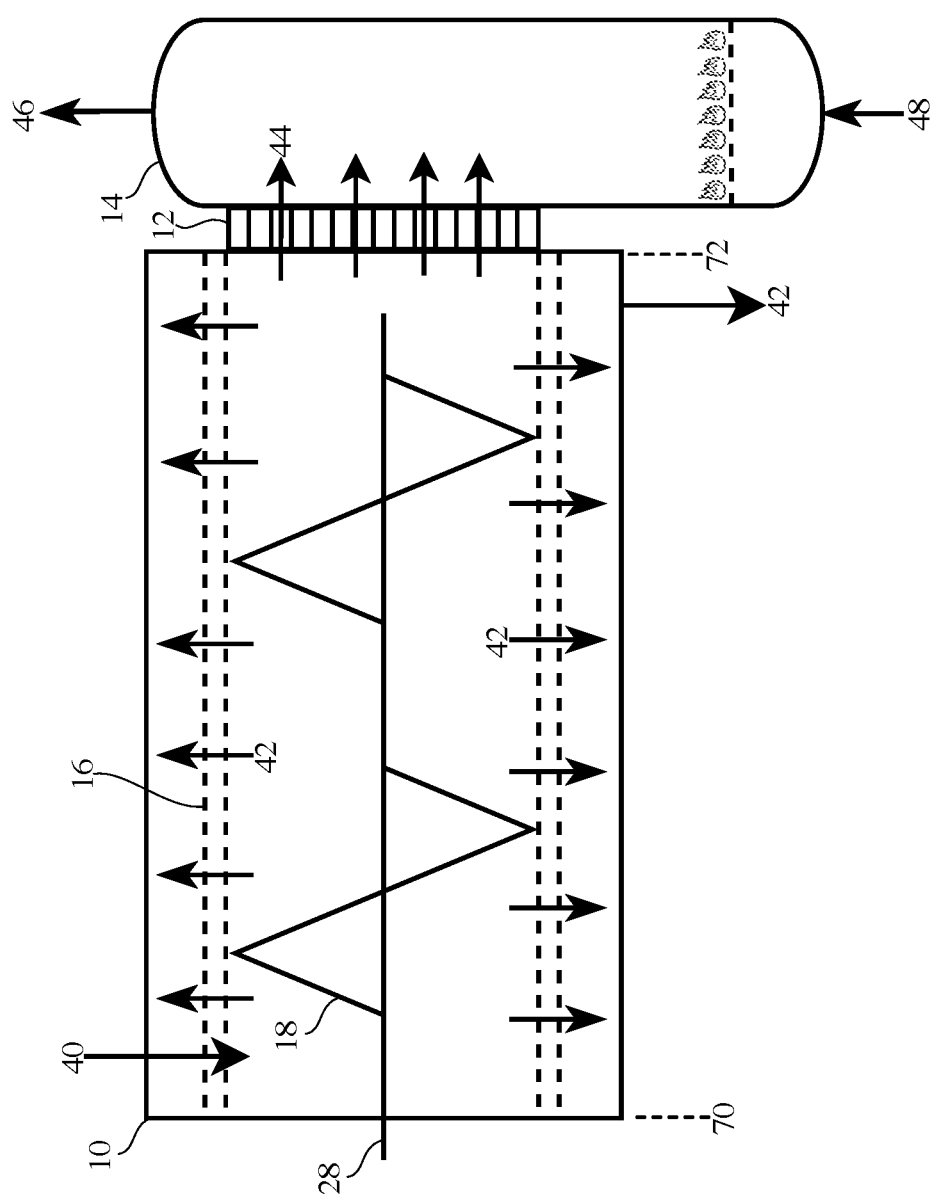
FIG. 4 is a process flow diagram showing a method for disposing of blackwater.

FIG. 4 is a process flow diagram showing a method for disposing of blackwater that may be used in one embodiment of the present invention. A first vessel 10 has a screw 18 and a filter 16. The screw 18 runs through the first vessel 10 from the first end 70 to the second end 72. The screw 18 is rotated by a shaft 28. The screw 18 is surrounded radially by the filter 16. An extrusion plate 12 is adjacent the second end 72 of the first vessel 10. A combustor vessel 14 is adjacent the extrusion plate 12. A blackwater stream 40 consists of a liquid component and a solids component. The blackwater stream 40 is passed into the first vessel 10 into the space inside the filter 16 around the screw 18. The blackwater stream 40 is conveyed by the screw 18 from the first end 70 to the second end 72 and is pressurized against the extrusion plate 12. The liquid component 42 is forced from the blackwater stream 40 through the filter 16 and the solids component 44 is forced through the extrusion plate into the combustor. The liquid component 42 leaves the first vessel 10. The solids component 44 is combusted with fuel 48 in the combustor vessel 14, resulting in combustion off-gas 46.

Figure 5:
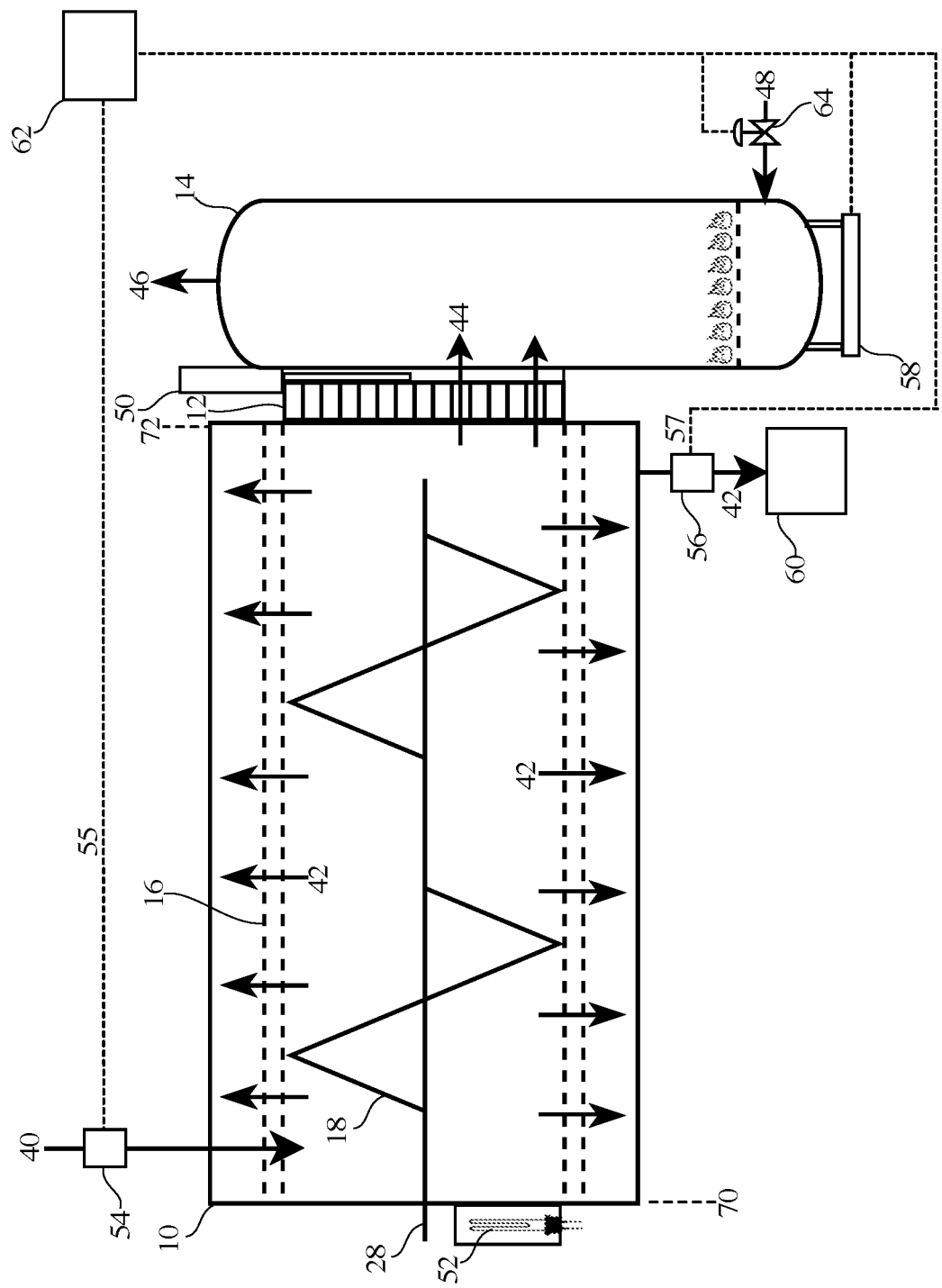
FIG. 5 is a process flow diagram showing a method for disposing of blackwater.

FIG. 5 is a process flow diagram showing a method for disposing of blackwater that may be used in one embodiment of the present invention. A first vessel 10 has a screw 18, a filter 16, and a heating element 52. The heating element 52 preheats the blackwater stream 40 in the first vessel 10. The screw 18 runs through the first vessel 10 from the first end 70 to the second end 72. The screw 18 is rotated by a shaft 28. The screw 18 is surrounded radially by the filter 16. An extrusion plate 12 with a knife-gate valve 50 is adjacent the second end 72 of the first vessel 10. A combustor vessel 14 is adjacent the extrusion plate 12. A blackwater stream 40 consists of a liquid component and a solids component. The blackwater stream 40 is passed through a first flow meter 54 and into the first vessel 10 into the space inside the filter 16 around the screw 18. The blackwater stream 40 is conveyed by the screw 18 from the first end 70 to the second end 72 and is pressurized against the extrusion plate 12. The liquid component 42 is forced from the blackwater stream 40 through the filter 16 and the solids component 44 is forced through the extrusion plate into the combustor. The liquid component 42 leaves the first vessel 10 and passes through a second flow meter 56 and into a graywater treatment system 60. The solids component 44 is combusted with fuel and air mix 48 in the combustor vessel 14, resulting in combustion off-gas 46.

In some embodiments, the knife-gate valve 50 is utilized to both help maintain back pressure and to slice the solids component 44 into small pieces as the solids component 44 is forced through the extrusion plate 12 into the combustor vessel 14 such that the solids component 44 is dropped into the combustor vessel 14 as pellets.

A number of sensors tied to a controller 62 are shown in FIG. 5 and are explained below.

In one embodiment, the combustion process is not continuous. When enough blackwater solids 44 are built up in the combustor vessel 14, combustion is initiated and the solids component 44 is incinerated. A weight sensor 58 is used to determine when enough blackwater solids 44 are built up and sends the information to the controller 62.

In one embodiment, coriolis meters that detect mass flowrates are used. The first meter 54 sends a first signal 55 to the controller 62. The second meter 56 sends a second signal 57 to the controller 62. The first signal 55 informs the controller 62 of the mass flowrate of the blackwater stream 40 into the first vessel 10. The second signal informs the controller 62 of the mass flowrate of the liquid component 42 out of the first vessel 10. By comparison, the mass of the solids component 44 passed into the combustor vessel 14 can be calculated. This information allows the controller 62 to calculate the amount of fuel and air mix 48 to provide to the combustor vessel 14 and control valve 64 to provide the fuel and air mix 48 as needed.

The invention has been described with reference to various specific and preferred embodiments and techniques. Nevertheless, it is understood that many variations and modifications may be made while remaining within the spirit and scope of the invention.

What is claimed is:

1. A system for disposing of blackwater comprising:
    a first vessel comprising a screw running through the first vessel from a first end to a second end, the screw surrounded radially by a filter and the first vessel comprising a blackwater inlet adjacent the first end;
    an extrusion plate adjacent the second end of the first vessel;
    a combustor vessel configured to receive a solids component from the extrusion plate;
    wherein a blackwater stream, comprising a liquid component and the solids component, is passed through the blackwater inlet into the first vessel, is conveyed by the screw from the first end to the second end, and is pressurized against the extrusion plate such that the liquid component is forced from the blackwater stream through the filter and the solids component is forced through the extrusion plate into the combustor vessel; and
    wherein the combustor vessel is configured to combust the solids component.

2. The system of claim 1, wherein the screw comprises a constant pitch.

3. The system of claim 1, wherein the screw comprises a decreasing pitch and an increasing stem diameter from the first end to the second end.

4. The system of claim 1, further comprising a heating element configured to heat the blackwater inside the first vessel.

5. The system of claim 1, wherein the extrusion plate further comprises a cutting device that slices the solids component as the solids component is forced through the extrusion plate into the combustor vessel such that the solids component is dropped into the combustor vessel as pellets.

6. The system of claim 1, further comprising a controller and a sensor, the sensor configured to determine a quantity of the solids component that has passed into the combustor vessel and provide the quantity to the controller, the controller determining that the quantity is over a threshold and signaling the combustor vessel to engage and combust the solids component.

7. The system of claim 6, wherein the sensor comprises a weight sensor under the combustor vessel.

8. The system of claim 6, wherein the sensor comprises a first flow meter that measures a blackwater flow rate into the first vessel.

9. The system of claim 8, further comprising a second flow meter that measures a liquid component flow rate out of the first vessel and passes the liquid component flow rate to the controller.

10. The system of claim 1, further comprising a graywater treatment system configured to treat the liquid component.

* * * * *